United States Patent [19]
Krishnamurthy et al.

[11] Patent Number: 6,141,382
[45] Date of Patent: Oct. 31, 2000

[54] USING ESTIMATED DISTORTION VALUES

[75] Inventors: Ravi Krishnamurthy, Plainsboro; Sriram Sethuraman, Hightstown, both of N.J.

[73] Assignees: Sarnoff Corporation, Princeton, N.J.; LG Electronics, Seoul, Rep. of Korea

[21] Appl. No.: 09/182,948

[22] Filed: Oct. 30, 1998

Related U.S. Application Data

[60] Provisional application No. 60/100,939, Sep. 18, 1998.

[51] Int. Cl.$^7$ ........................................................ H04N 7/36
[52] U.S. Cl. ........................................ 375/240.17; 348/699
[58] Field of Search ........................ 375/240.17; 348/699, 348/402, 402.1, 407, 407.1, 413, 413.1, 416, 416.1

[56] References Cited

U.S. PATENT DOCUMENTS

| | | | |
|---|---|---|---|
| 5,623,313 | 4/1997 | Naveen | 348/699 X |
| 6,028,638 | 2/2000 | Kim | 348/699 X |
| 6,058,212 | 5/2000 | Yokoyama | 348/699 X |
| 6,067,322 | 5/2000 | Wang | 348/416 X |

FOREIGN PATENT DOCUMENTS

| | | | |
|---|---|---|---|
| 0 468 279 A2 | 1/1992 | European Pat. Off. | H04N 7/137 |
| 0 765 088 A2 | 3/1997 | European Pat. Off. | H04N 7/36 |

OTHER PUBLICATIONS

Jechang Jeong Et Al: "Subpixel–Accuracy Motion Estimation Using a Model for Motion–Compensated Errors" Proceedings of the Picture Coding Symposium (PCS), CH, Lausanne, SFIT, vol. –, Mar. 17, 1993, p. 134–A–134–B XP000346451 paragraph 'OOII!

Senda Y Et Al: "A Smiplified Motion Estimation Using an Approximation for the MPEG–2 Real–Time Encoder" Proceedings of the International Conference on Acoustics, Speech, and Signal Proceedings (ICASSP), US, New York, IEEE, vol. CONF. 20, May 9, 1995, p. 2273–2276 XP000535407 ISBN: 0–7803–2432–3 paragraph '02.2!

PCT International Search Report corresponding to PCT application PCT/US99/21833.

*Primary Examiner*—Howard Britton
*Attorney, Agent, or Firm*—William J. Burke

[57] ABSTRACT

After performing integer-pel motion estimation to select the best integer-pel location, half-pel (or other fractional-pel) motion estimation is performed by estimating the distortion values for all of the surrounding half-pel locations by linearly interpolating using the distortion value for the best integer-pel location and the distortion values available from the integer-pel motion estimation analysis corresponding to the surrounding integer-pel locations. A subset of those half-pel locations is then selected as candidate half-pel locations (e.g., based on lowest estimated distortion values) and true distortion values are then generated for those candidate locations. The best half-pel location is then selected based on the distortion values for the candidate half-pel locations and the best integer-pel location. This best half-pel location may then be used to perform the motion-compensated inter-frame differencing step of a video coding scheme.

20 Claims, 2 Drawing Sheets

USING ESTIMATED DISTORTION VALUES

CROSS-REFERENCE TO RELATED APPLICATIONS

This application claims the benefit of the filing date of U.S. provisional application no. 60/100,939, filed on Sep. 18, 1998 as attorney docket no. SAR 12728PROV.

BACKGROUND OF THE INVENTION

1. Field of the Invention

The present invention relates to image processing, and, in particular, to half-pel motion estimation used in video coding.

2. Description of the Related Art

In video coding, it is known to encode images using motion-compensated inter-frame differencing in which blocks of image data are encoded based on the pel-to-pel differences between each block in an image currently being encoded and a selected block in a reference image. The process of selecting a block in the reference image for a particular block in the current image is called motion estimation. The goal of motion estimation is to find a block in the reference image that closely matches the block in the current image so that the pel-to-pel differences between those two blocks are small, thereby enabling the block in the current image to be encoded in the resulting compressed bitstream using a relatively small number of bits.

In a typical motion estimation algorithm, a block in the current image is compared with different blocks of the same size and shape in a defined search region in the reference image. The search region is typically defined based on the corresponding location of the block in the current image with allowance for inter-frame motion by a specified number of pels (e.g., 8) in each direction. Each comparison involves the computation of a mathematical distortion measure that quantifies the differences between the two blocks of image data. One typical distortion measure is the sum of absolute differences (SAD) which corresponds to the sum of the absolute values of the corresponding pel-to-pel differences between the two blocks, although other distortion measures are also used.

There are a number of methods for identifying the block of reference image data that "best" matches the block of current image data. In a "brute force" exhaustive approach, each possible comparison over the search region is performed and the best match is identified based on the lowest distortion value. In order to reduce the computational load, alternative schemes, such as log-based or layered schemes, are often implemented in which only a subset of the possible comparisons are performed. In either case, the result is the selection of a block of reference image data as the block that "best" matches the block of current image data. This selected block of reference image data is referred to as the "best integer-pel location," because the distance between that block and the corresponding location of the block of current image data may be represented by a motion vector having X (horizontal) and Y (vertical) components that are both integers representing displacements in integer numbers of pels. The process of selecting the best integer-pel location is referred to as full-pel or integer-pel motion estimation.

In order to improve the overall encoding scheme even further, half-pel motion estimation may be performed. In half-pel motion estimation, after performing integer-pel motion estimation to select the best integer-pel location, the block of current image data is compared to reference image data corresponding to different half-pel locations surrounding the best integer-pel location.

FIG. 1 shows a graphical representation of the locations of the relevant blocks of reference image data for half-pel motion estimation. In FIG. 1, location 0 (*) corresponds to the best integer-pel location, locations 1–8 (o) correspond to the 8 integer-pel locations immediately surrounding the best integer-pel location, and locations 1'–8' correspond to the 8 half-pel locations immediately surrounding the best integer-pel location.

In a typical half-pel motion estimation algorithm, after the best integer-pel location is selected (using an appropriate integer-pel motion estimation algorithm), each of the 8 different half-pel locations 1'–8' is compared with the block of current image data (i.e., 8 distortion values are generated) to determine which if any of the 8 half-pel locations provides a better match (e.g., lower distortion value) with the block of current image data than the best integer-pel location. The best of these 9 locations is then used for motion-compensated inter-frame differencing.

For each half-pel comparison, data corresponding to two or more different integer-pel blocks in the reference image are interpolated before computing the distortion value. For example, for the half-pel comparison at location 1', the reference image data corresponding to the integer-pel location 0 is linearly interpolated with the reference image data corresponding to the integer-pel location 1 to generate interpolated reference image data that is then compared with the block of current image data to generate a distortion value for location 1'. For the half-pel comparison at location 2', the interpolated reference image data are generated by performing two-dimensional linear interpolation using the reference image data corresponding to four integer-pel locations 0, 1, 2, and 3. As can be appreciated, the computational load involved in generating the interpolated reference data and then generating the distortion value for each comparison in such half-pel motion estimation can be quite large.

SUMMARY OF THE INVENTION

The present invention is directed to a half-pel (or other fractional-pel) motion estimation algorithm that reduces the computational load relative to traditional algorithms. According to the present invention, half-pel motion estimation is performed without having to calculate the distortion value for each of the 8 possible half-pel locations surrounding the best integer-pel location.

According to one embodiment, the present invention is a method for processing image data, comprising the steps of: (a) performing motion estimation analysis to select one integer-pel location based on distortion values for a plurality of integer-pel locations; (b) generating estimated distortion values for a plurality of fractional-pel locations by interpolating the distortion values for the integer-pel locations; (c) selecting a subset of the fractional-pel locations as one or more candidate fractional-pel locations; (d) generating true distortion values for the candidate fractional-pel locations; and (e) selecting a location from the set comprising the candidate fractional-pel locations and the selected integer-pel location as the best fractional-pel location.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
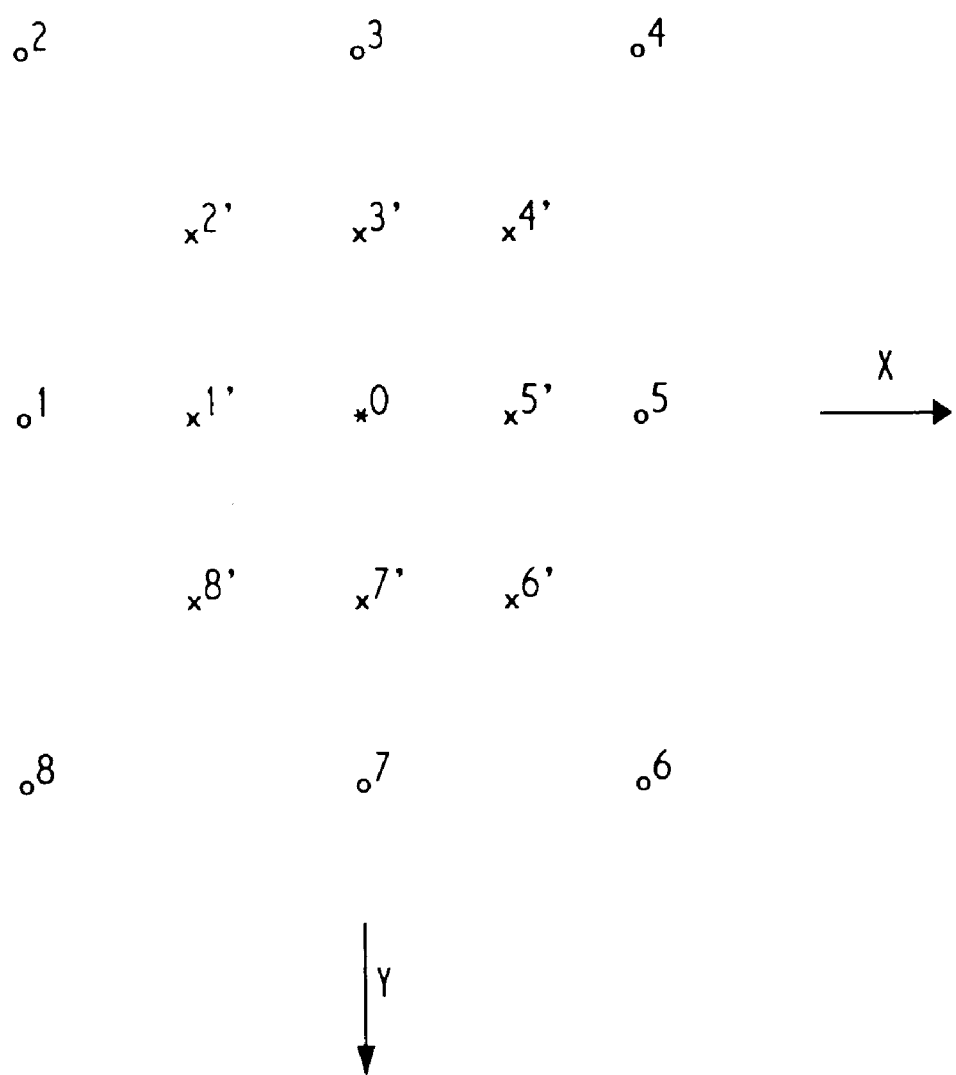
FIG. 1 shows a graphical representation of the locations of the relevant blocks of reference image data for half-pel motion estimation.
Figure 2:
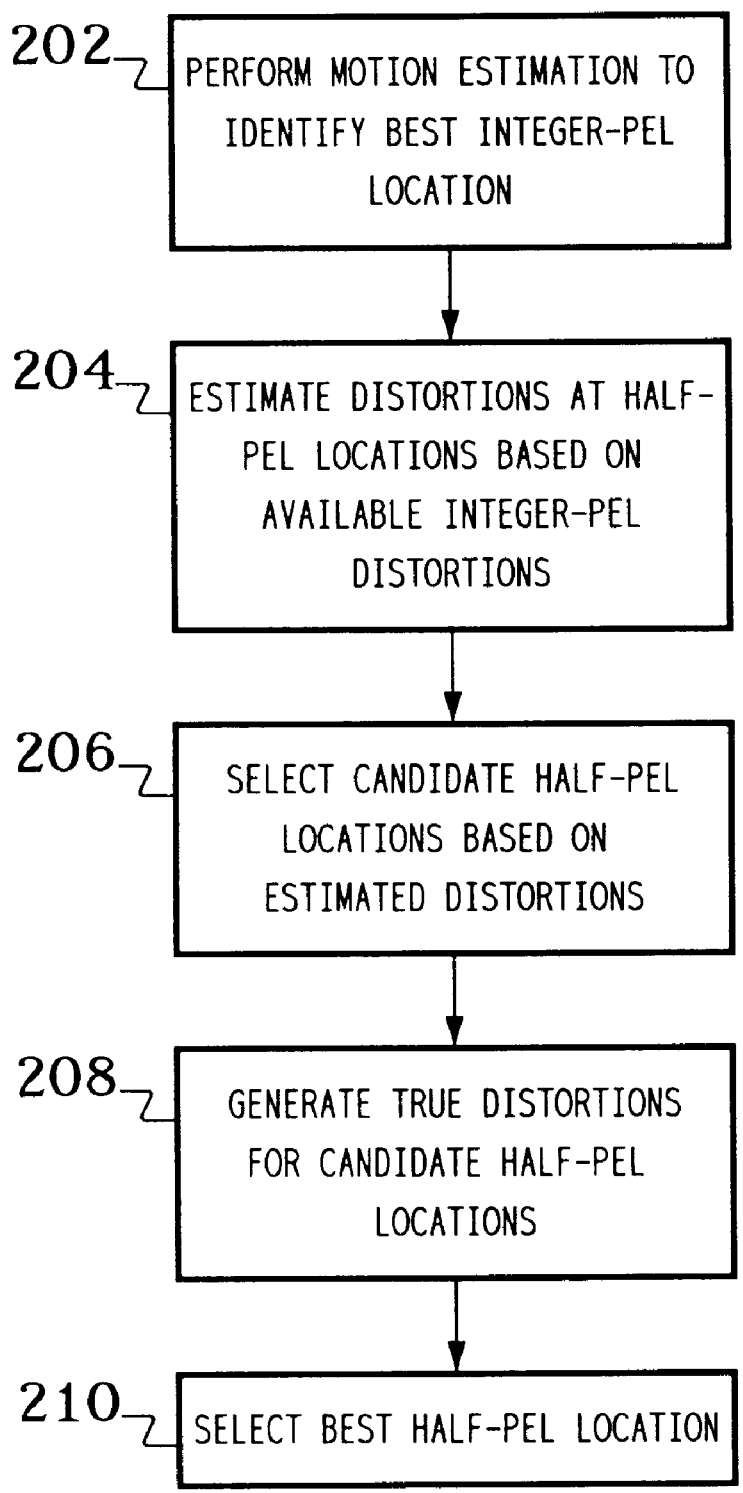
FIG. 2 shows a flow diagram of the half-pel motion estimation algorithm for each block of current image data, according to one embodiment of the present invention.

FIG. 2 shows a flow diagram of a half-pel motion estimation algorithm for each block of current image data, according to one embodiment of the present invention. According to this algorithm, some type of integer-pel motion estimation is performed to select the best integer-pel match in the reference image for the block of current image data (i.e., corresponding to location 0 in FIG. 1) (step 202 in FIG. 2). Depending on the type of integer-pel motion estimation algorithm employed, the distortion values at all eight of the surrounding integer-pel locations (i.e., locations 0–8 in FIG. 1) may or may not be available. For example, if a brute-force, exhaustive integer-pel motion estimation algorithm is implemented, then all 8 surrounding integer-pel distortion values will be available. If, however, a non-exhaustive search (such as a log search or a layered search) is performed, then only a subset of the 8 surrounding integer-pel distortion values may be available.

In either case, following the integer-pel motion estimation of step 202, estimated distortion values for the 8 half-pel locations are generated by performing weighted linear interpolation using whatever integer-pel distortion values are available (step 204). For example, if all 8 integer-pel distortion values are available, then the 8 half-pel distortion values may be generated as follows:

$$Di' = (D0 + Di)/2$$

where Di' is the distortion value at the $i^{th}$ half-pel location, D0 is the distortion value at the best integer-pel location 0, and Di is the distortion value at the $i^{th}$ integer-pel location. If one or more of the integer-pel distortion values are not available (e.g., because a non-exhaustive integer-pel motion estimation search was performed), then the corresponding half-pel distortion values are generated using different integer-pel distortion values that are available. For example, if D2 is not available, but D0, D1, and D3 are available, then D2' can be generated by averaging D1 and D3. Similarly, if D2 and D3 are not available, but D0, D1, and D4 are available, then D2' and D3' can be generated as follows:

$$D2' = (3*D1 + D4)/4$$

$$D3' = (D1 + D4)/2$$

It will be understood that other linear interpolation schemes are also possible for this step, including interpolation schemes that take into account all available integer-pel distortion values when calculating each estimated half-pel distortion value.

After generating estimated distortion values for all 8 half-pel locations, a subset (e.g., 3) of those half-pel locations is selected as candidate "best" half-pel locations for further analysis (step 206). The candidate half-pel locations are preferably those with the lowest estimated distortion values. A simple bubble-sort routine can be implemented when the number of candidates is small (e.g., <=3).

True distortion values are then generated for the candidate half-pel locations (step 208). As in the prior-art algorithm described earlier, this involves generating appropriate interpolated reference image data and then comparing that interpolated reference image data to the block of current image data to generate a true distortion value for each candidate half-pel location. The distortion measure used for this step may be the same as or different from the distortion measure used during the integer-pel motion estimation of step 202. If a different distortion measure is used, then this different distortion measure is also applied to generate a new distortion value for the best integer-pel location 0.

The location to be used for motion-compensated inter-frame differencing is then selected as the best location (e.g., lowest distortion value) from the candidate half-pel locations and the best integer-pel location (step 210).

Note that the best integer-pel location selected during the integer-pel motion estimation of step 202 may fall on the boundary of the reference image search region. In such (relatively rare) cases, all 8 half-pel locations will not be possible. These cases can be handled as exceptions by estimating in step 204 distortion values for only the allowable half-pel locations.

The present invention reduces the computational load involved in implementing half-pel motion estimation by not having to generate interpolated reference image data for all possible half-pel locations and not having to generate true distortion values for all possible half-pel locations. This can be particularly advantageous in real-time, low-rate video conferencing applications (such as H.263) in which the processing needs to be implemented as the images are generated and half-pel motion estimation is desired to provide improved compression (i.e., fewer bits in the transmitted bitstream).

Nevertheless, by generated estimated distortion values and selecting an appropriate number of candidate half-pel locations for subsequent true-distortion-value analysis, the present invention provides sufficiently accurate half-pel motion estimation results. When 3 candidate half-pel locations are selected in step 206, the present invention will almost always select the same half-pel location as that selected using the conventional exhaustive half-pel approach in which the true distortion value is generated for all possible half-pel locations. Even when only one candidate half-pel location is selected in step 206, excellent performance is achieved with only a slight performance drop from the exhaustive half-pel approach.

Although the present invention has been described in the context of motion estimation based on the SAD measure, it will be understood that the present invention can be implemented using other distortion measures, such as the sum of squared differences (SSD), the maximum absolute difference (MAD), or other suitable distortion measures, including basing selections on two or more different distortion measures.

Similarly, although the present invention has been described in the context of half-pel motion estimation, the present invention can also be applied to fractional-pel motion estimation algorithms. By the same token, the present invention can be implemented using distortion values for integer-pel locations that are separated from the best integer-pel location by more than one pel in either X or Y direction (i.e., using integer-pel locations other than those immediately surrounding the selected best integer-pel location). This can be particularly useful when non-exhaustive integer-pel motion estimation is used to select the best integer-pel location and distortion values for all of the immediately surrounding integer-pel locations are not available. Moreover, the present invention can also be implemented using non-linear interpolation schemes, such as one- or two-dimensional quadratic or higher interpolation schemes.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing image data, comprising the steps of:
   (a) performing motion estimation analysis to select one integer-pel location based on distortion values for a plurality of integer-pel locations;
   (b) generating estimated distortion values for a plurality of fractional-pel locations by interpolating the distortion values for the integer-pel locations;
   (c) selecting a subset of the fractional-pel locations as one or more candidate fractional-pel locations;
   (d) generating true distortion values for the candidate fractional-pel locations; and
   (e) selecting a location from the set comprising the candidate fractional-pel locations and the selected integer-pel location as the best fractional-pel location.

2. The invention of claim 1, wherein the distortion measure used to generate the distortion values in step (a) is different from the distortion measure used to generate the distortion values in step (d).

3. The invention of claim 1, wherein the distortion measure used to generate the distortion values in step (d) is a sum of absolute differences.

4. The invention of claim 1, further comprising the step of using the best fractional-pel location to perform motion-compensated inter-frame differencing as part of a video coding algorithm.

5. The invention of claim 1, wherein the fractional-pel locations are half-pel locations and step (b) comprises the step of estimating distortion values for a plurality of half-pel locations by linearly interpolating the distortion values for the integer-pel locations.

6. The invention of claim I, wherein the motion estimation of step (a) is a non-exhaustive motion estimation search, the plurality of integer-pel locations does not include all possible integer-pel locations surrounding the selected integer-pel location, and step (b) comprises the step of generating estimated distortion values for the fractional-pel locations by interpolating the distortion values for available integer-pel locations.

7. The invention of claim 1, wherein:
   the fractional-pel locations are half-pel locations;
   step (b) comprises the step of estimating distortion values for a plurality of half-pel locations by linearly interpolating the distortion values for the integer-pel locations;
   the distortion measure used to generate the distortion values in step (d) is a sum of absolute differences; and
   further comprising the step of using the best fractional-pel location to perform motion-compensated inter-frame differencing as part of a video coding algorithm.

8. The invention of claim 7, wherein the motion estimation of step (a) is a non-exhaustive motion estimation search, the plurality of integer-pel locations does not include all possible integer-pel locations surrounding the selected integer-pel location, and step (b) comprises the step of generating estimated distortion values for the fractional-pel locations by interpolating the distortion values for available integer-pel locations.

9. The invention of claim 7, wherein the distortion measure used to generate the distortion values in step (a) is different from the distortion measure used to generate the distortion values in step (d).

10. A computer-readable medium having stored thereon a plurality of instructions, the plurality of instructions including instructions which, when executed by a processor, cause the processor to implement a method for processing image data, the method comprising the steps of:
    (a) performing motion estimation analysis to select one integer-pel location based on distortion values for a plurality of integer-pel locations;
    (b) generating estimated distortion values for a plurality of fractional-pel locations by interpolating the distortion values for the integer-pel locations;
    (c) selecting a subset of the fractional-pel locations as one or more candidate fractional-pel locations;
    (d) generating true distortion values for the candidate fractional-pel locations; and
    (e) selecting a location from the set comprising the candidate fractional-pel locations and the selected integer-pel location as the best fractional-pel location.

11. The invention of claim 10, wherein the distortion measure used to generate the distortion values in step (a) is different from the distortion measure used to generate the distortion values in step (d).

12. The invention of claim 10, wherein the distortion measure used to generate the distortion values in step (d) is a sum of absolute differences.

13. The invention of claim 10, further comprising the step of using the best fractional-pel location to perform motion-compensated inter-frame differencing as part of a video coding algorithm.

14. The invention of claim 10, wherein the fractional-pel locations are half-pel locations and step (b) comprises the step of estimating distortion values for a plurality of half-pel locations by linearly interpolating the distortion values for the integer-pel locations.

15. The invention of claim 10, wherein the motion estimation of step (a) is a non-exhaustive motion estimation search, the plurality of integer-pel locations does not include all possible integer-pel locations surrounding the selected integer-pel location, and step (b) comprises the step of generating estimated distortion values for the fractional-pel locations by interpolating the distortion values for available integer-pel locations.

16. The invention of claim 10, wherein:
    the fractional-pel locations are half-pel locations;
    step (b) comprises the step of estimating distortion values for a plurality of half-pel locations by linearly interpolating the distortion values for the integer-pel locations;

the distortion measure used to generate the distortion values in step (d) is a sum of absolute differences; and further comprising the step of using the best fractional-pel location to perform motion-compensated inter-frame differencing as part of a video coding algorithm.

17. The invention of claim 16, wherein the motion estimation of step (a) is a non-exhaustive motion estimation search, the plurality of integer-pel locations does not include all possible integer-pel locations surrounding the selected integer-pel location, and step (b) comprises the step of generating estimated distortion values for the fractional-pel locations by interpolating the distortion values for available integer-pel locations.

18. The invention of claim 16, wherein the distortion measure used to generate the distortion values in step (a) is different from the distortion measure used to generate the distortion values in step (d).

19. An apparatus for processing image data, comprising:

(a) means for performing motion estimation analysis to select one integer-pel location based on distortion values for a plurality of integer-pel locations;

(b) means for generating estimated distortion values for a plurality of fractional-pel locations by interpolating the distortion values for the integer-pel locations;

(c) means for selecting a subset of the fractional-pel locations as one or more candidate fractional-pel locations;

(d) means for generating true distortion values for the candidate fractional-pel locations; and (e) means for selecting a location from the set comprising the candidate fractional-pel locations and the selected integer-pel location as the best fractional-pel location.

20. The invention of claim 19, wherein:

the fractional-pel locations are half-pel locations;

means (b) comprises means for estimating distortion values for a plurality of half-pel locations by linearly interpolating the distortion values for the integer-pel locations;

the distortion measure used to generate the distortion values by means (d) is a sum of absolute differences; and further comprising means for using the best fractional-pel location to perform motion-compensated inter-frame differencing as part of a video coding algorithm.

* * * * *